Aug. 23, 1932.  W. E. GOLDSBOROUGH  1,872,931
FUEL SUPPLY FOR INTERNAL COMBUSTION ENGINES
Filed March 19, 1928
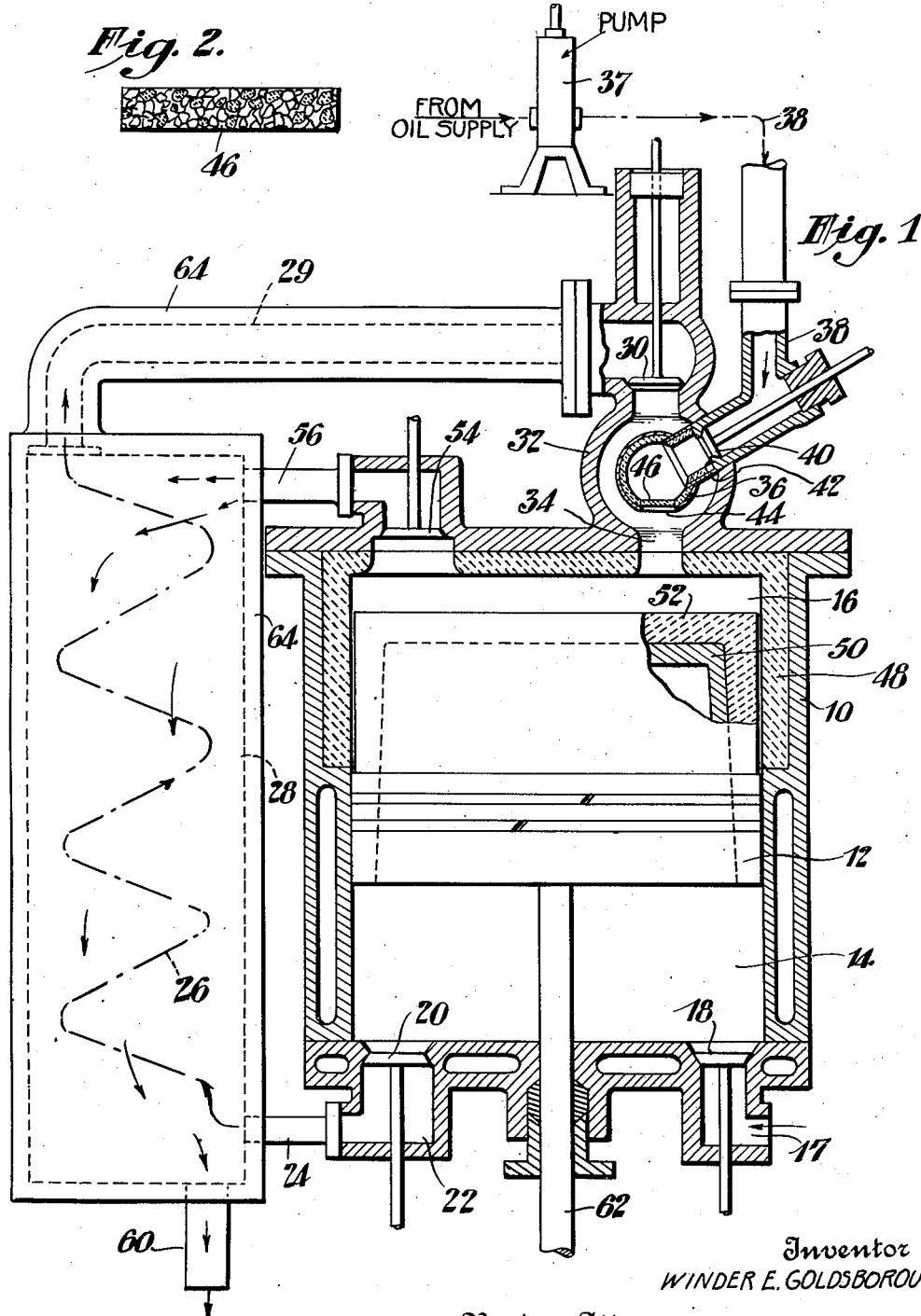
Inventor
WINDER E. GOLDSBOROUGH
By his Attorney Patented Aug. 23, 1932

1,872,931

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

FUEL SUPPLY FOR INTERNAL COMBUSTION ENGINES

Application filed March 19, 1928. Serial No. 262,659.

The present invention relates to internal combustion engines using fluid fuel.

It has been proposed to employ a fuel chamber within the combustion chamber of an internal combustion engine and to introduce the fuel into the combustion space through a perforated wall forming part of the fuel chamber. Difficulty has been encountered in practice, however, with the arrangement just described. The fuel chamber is necessarily exposed to a high temperature and has become so hot as to carbonize a good deal of the fuel and to choke the perforations through which the fuel should discharge to the combustion chamber.

It is one object of the present invention to provide an internal combustion engine having a fuel chamber arranged to discharge into the combustion chamber and in which difficulties due to carbonization of fuel are avoided.

It has been proposed also to line the combustion chamber of an internal combustion engine with a non-conducting refractory to prevent loss of heat from the combustion chamber. If, however, it is attempted to use a fuel chamber of conducting material in a combustion chamber with a non-conducting lining enough heat is lost from the combustion chamber through the fuel chamber to make the added expense of the liner not worth the while.

It is another object of the present invention to provide a commercially feasible internal combustion engine having a non-conducting lining in the combustion chamber, and having a fuel chamber connected to a combustion chamber through a perforated wall.

Further objects and advantages of the present invention will hereinafter appear.

In the accompanying drawing, there is illustrated an apparatus embodying one form of the present invention.

In said drawing:

Fig. 1 is an elevational view, partly diagrammatic in character, of an internal combustion engine according to the present invention, parts being shown in section and parts being broken away for purposes of illustration;

Fig. 2 is a detail sectional view of a perforated or porous diaphragm forming the outlet of the fuel chamber illustrated in Fig. 1.

It is advantageous that the fuel and air in the combustion chamber of an engine be mixed as uniformly as possible. For instance, it is known that more complete combustion of the fuel is obtained in carburetor motors than in Diesel type motors. The reason for this is said to be that, in a carburetor type motor, the mixture is so uniform that combustion involves only chemical action, whereas, in a Diesel or like engine using spray injection, combustion involves physical movement as well as chemical action.

An engine according to the present invention is capable of obtaining very thorough mixing of air and fuel even when heavy oils of the type used in Diesel engines are employed. The result is that applicant obtains a detonating combustion similar to that in motors using gasoline fuel and carburetors.

Referring to the drawing more in detail, 10 indicates the cylinder of an internal combustion engine within which is mounted to reciprocate a piston 12. In the arrangement illustrated, piston 12 divides the cylinder 10 into a lower air compressing chamber 14 and an upper combustion chamber 16. Chamber 14 is provided with an air intake port 17 controlled by an inlet valve 18. On the upstroke of piston 12 air is drawn in past the valve 18. On the down stroke of piston 12, compressed air is discharged through outlet valve 20. The outlet port for valve 20 is indicated at 22 and from this point air which has been compressed in chamber 14 passes by way of pipe 24 into a heating coil 26 within a recuperator 28. Within the coil 26, the compressed air is preheated to the temperature of ignition of the fuel by heat from products of combustion which have been discharged from chamber 16. From the coil 26, the compressed air passes through pipe 29 to the chamber 16 where it supports the combustion of fuel with the production of power on the down stroke of piston 12. The arrangement of the engine as heretofore described will be understood to form no part of the present invention and is not claimed herein. Intermediate the pipe 29 and chamber 16 is a valve 30 controlling the admission of preheated compressed air to the combustion chamber.

In the arrangement illustrated, chamber 32 is connected intermediate the valve 30 and the cylinder 10. After passing through the valve 30, the preheated compressed air passes through chamber 32 and port 34 into the combustion chamber 16. Preferably within the chamber 32, which may be conveniently of spherical form, is a fuel chamber 36. Fluid fuel, preferably heavy oil, is delivered to the chamber 36 by means of a fuel pump 37, which may conveniently be of the type used in Diesel engines. In the arrangement illustrated, liquid fuel is brought to the engine through a pipe 38 in which, near the chamber 36, is a fuel valve 40 having a seat 42 in the pipe 38. Pipe 38 connects with the interior of chamber 36 so that the fuel passes directly to the interior of the chamber whenever the valve 40 is opened. According to the present invention, the wall of chamber 36 is formed of material having a poor heat conducting capacity. The use of material of the character just mentioned for the wall of chamber 36 is to prevent the possibility of carbonizing any of the fuel within the chamber. Since the air entering chamber 32 through the valve 30 and which surrounds the inner fuel chamber 36 has been heated to or above the ignition point of the fuel being used, if the chamber 36 were of metal or like heat conductive material, some of the oil would be carbonized in the chamber. Especially is this the case when heavy oil is being used. Heavy oil has a high ignition point, but is readily cracked. However, it is preferred that oil in the chamber 36 be preheated and sometimes that some of the constituents of the oil be vaporized in the chamber 36. Therefore the wall of chamber 36 is not made as nonconducting as it might be.

The wall of the chamber 36 is cut away in line with the port 34 to form a port 44 for the exit of fuel. According to the present invention, fuel leaves the port 44 in very finely divided condition and is therefore well adapted to form a heavy, uniform and intimate mixture with the air which has passed around the chamber 36 and is passing out of the chamber 32 through the port 34. For the purpose of finely dividing the fuel and mixing it with the air as just described a porous diaphragm 46 is placed across the port 44. Diaphragm 46 possesses a high degree of porosity and may be conveniently made according to the process disclosed in Patent No. 1,223,308 to Bone et al. However, the refractory granules or particles used in making diaphragm 46 should not be of fire-clay as suggested in said Patent 1,223,308 for the reason that fire-clay and like substances are too highly conductive of heat. The diaphragm 46 facing, as it does, the combustion chamber 16 through the port 34 is subjected to intense radiation from chamber 16 during the combustion of the fuel therein and must be of nonheat conducting material in order that the interior of the diaphragm shall not become heated to the degree causing oil in its apertures to carbonize and check the flow of fuel through the diaphragm or to backfire into the chamber 36. By the use of this diaphragm a fluid fuel either gas or oil may be used for driving the engine. Grains or granules of native zircon (zirconium silicate) have been found to be suitable for the manufacture of diaphragms such as 46. Diaphragms formed according to the process described in said patent, but of zircon grains possess a high uniform porosity permitting the ready discharge of heavy fuel oil from the chamber 46. However, other processes and other non-conducting materials than zircon may be used, although zircon is the preferred material.

It will be seen that, in the arrangement illustrated, the fuel chamber 36 is equally spaced from the inner surface of the chamber 32 so that the preheated air passes around the chamber 36 uniformly. It will be seen also that the chamber 32 contracts to the port 34 through which the air leaves the chamber 32 and enters the combustion chamber 16. Since the port 34 lies directly in the line between the port 44 in which the diaphragm 46 is mounted and the combustion chamber 16, finely divided oil particles and vapors discharged from port 44 fall directly into the air stream converging toward the mouth of port 34 and are intimately mixed therewith in passing through the port 34 to combustion chamber 16.

The cylinder 10 and piston 12 may be of any desired or known design, but it is preferred to line combustion chamber 16 with heat insulating refractory 48 and to provide the piston 12 with an extension 50 on which is a lining or covering 52 also of heat insulating refractory. The linings or coverings 48 and 52 are preferably of zircon bonded by about 12% of orthophosphoric acid, but the present invention is not limited to linings of zircon or to any particular bonding material for the refractory. The fuel is burned with air in chamber 16 on the down stroke of piston 12 for the production of power. On the upstroke of piston 12, the products of combustion are discharged through the exhaust valve 54 and pass by pipe 56 into the casing of recuperator 28. After preheating the compressed air in recuperator 28 as above described, the products of combustion may be conveniently discharged to atmosphere through pipe 60.

The power developed by the reciprocation of the piston 12 will be understood to be transmitted to a working shaft through the piston rod 62 and the ordinary crank and pitman connection (not shown) or through other convenient mechanism. It will be understood also that suitable mechanism is known for the operation of valves of the character indicated by numerals 18, 20, 30, 40 and 54, and that such mechanism therefore is not illustrated herein in detail. It will be understood moreover that fuel valve 40 is always to be open during at least part of the time that the air inlet valve 30 is open. The casings of recuperator 28, of pipe 29 and of chamber 32 are covered by means of heat insulating lagging 64, parts of which only are illustrated in the drawing.

It will be noted that the stream of air or combustion supporting gas entering through valve 30 passes around the outside of chamber 36 and surrounds the stream of fuel coming from the diaphragm 46 so that, as the fuel enters the combustion chamber, the flaring out of the two streams produces very rapid mixing and combustion. It will be noted also that the air is precompressed before entering the engine cylinder, so that the fuel passes thru diaphragm 46 against a material pressure. The apparatus according to the present invention is therefore a high pressure combustion system in which the pressure against which the fuel discharges is measured in pounds per square inch above atmospheric pressure, whereas in the ordinary diaphragm combustion system, the pressure in the combustion chamber is measured in inches of water or is below the atmospheric pressure. Preferably, the beginning of the fuel discharge into the combustion chamber occurs when the air pressure is about 150 lbs. gage. The invention is not limited to this, however. After the combustion begins, the pressure preferably rises rapidly to about 600 lbs. gage. The apparatus according to the present invention may be used equally as well, if desired, in engines and other apparatus in which the pressure in the combustion space does not rise during combustion.

While a particular embodiment of the present invention has been described and illustrated herein in detail, the present invention is not to be limited by details of the disclosure, the invention being defined and limited solely by the appended claims. In particular it will be understood that it is not necessary that the discharge from the fuel chamber 36 enter the combustion chamber 16 through the same port or at the same point as the preheated compressed air.

Having thus described my invention, I claim:

1. The combination of a combustion chamber, a liquid fuel chamber having a heat insulating wall, an air passage surrounding the greater part of said fuel chamber, and means for forcing hot air through said passage, said fuel chamber having a heat insulating perforate diaphragm arranged to permit passage of fuel from the liquid fuel chamber into the path of said air.

2. The combination in an internal combustion engine of a combustion chamber, a liquid fuel chamber, and an air passage surrounding said fuel chamber, said combustion chamber having a port through which said passage makes delivery and said fuel chamber having a heat insulating porous diaphragm facing said port.

In testimony whereof I affix my signature.
WINDER E. GOLDSBOROUGH.